United States Patent [19]
Cusimano

[11] Patent Number: 6,042,074
[45] Date of Patent: Mar. 28, 2000

[54] FOUNDATION PIER COUPLING SYSTEM

[76] Inventor: Matt Cusimano, 267 Aptos Beach Dr., Aptos, Calif. 95003

[21] Appl. No.: 08/988,564

[22] Filed: Dec. 11, 1997

Related U.S. Application Data

[63] Continuation-in-part of application No. 08/650,183, May 20, 1996, Pat. No. 5,711,504.

[51] Int. Cl.[7] .................................................. F16M 13/00
[52] U.S. Cl. .................................. 248/354.1; 248/354.3; 248/357; 254/424; 280/763.1; 52/126.6
[58] Field of Search ............................. 248/354.1, 354.3, 248/357, 354.5, 352, 644, 649, 650, 688, 228.5, 228.1; 254/424, 418, 423, 427, 419, DIG. 1; 280/475, 763.1, 764.1, 765.1, 766.1; 52/126.6, 126.7, DIG. 11

[56] References Cited

U.S. PATENT DOCUMENTS

| | | | |
|---|---|---|---|
| 1,062,871 | 5/1913 | Aaron | 254/424 X |
| 2,570,334 | 10/1951 | Erjavec | 254/418 |
| 2,976,055 | 3/1961 | Harrison | 280/763.1 |
| 3,315,973 | 4/1967 | Marple | 280/763.1 X |
| 3,332,699 | 7/1967 | Devys | 280/763.1 X |
| 3,362,683 | 1/1968 | Hansen | 254/423 |
| 3,667,730 | 6/1972 | Kollmar | 254/424 |
| 3,825,279 | 7/1974 | Schmeichel | 280/766.1 |
| 4,084,789 | 4/1978 | Francis | 254/418 |
| 4,870,789 | 10/1989 | Clark et al. | 248/354.3 X |
| 4,882,887 | 11/1989 | Giles et al. | 248/228.1 X |
| 5,421,611 | 6/1995 | Peterson et al. | 254/418 X |
| 5,595,366 | 1/1997 | Cusimano et al. | 248/354.3 |

*Primary Examiner*—Leslie A. Braun
*Assistant Examiner*—Stephen S. Wentsler
*Attorney, Agent, or Firm*—Robert Charles Hill

[57] ABSTRACT

A foundation pier coupling system is semi-permanently attached to a movable dwelling, such as a mobile home or commercial coach, is provided. The invented system includes coupling members that are attached to a support beam of the dwelling and to a pier, for securing the pier to the dwelling. The coupling members are hingably coupled together, enabling the pier to pivot relative to the support beam. The pier is pivoted against the beam when transporting the dwelling with the pier attached to the beam. A retaining member is provided for retaining the pier against the beam, to prevent the pier from accidentally contacting a ground surface when the dwelling is in transit. At an installation site, the pier is pivoted away from the beam, until it is perpendicular thereto and to the ground, for installing the dwelling. The height of the pier is then adjusted to secure the pier to the ground and support the dwelling. The coupling members may be configured with a locking device to prevent the coupling members from inadvertently pivoting. The coupling members are preferably detachably coupled together, for separating the coupling system from the dwelling, if it is desired.

2 Claims, 4 Drawing Sheets

FOUNDATION PIER COUPLING SYSTEM

This application is a Continuation-in-Part of U.S. patent application Ser. No. 08/650,183, filed May 20, 1996, now U.S. Pat. No. 5,711,504.

BACKGROUND OF THE INVENTION

1. Field of the Invention

The present invention relates generally to coupling systems for attaching foundation piers to movable dwellings, such as mobile homes, commercial coaches and temporary and emergency offices, and more particularly, to an improved coupling system for semi-permanently attaching a foundation pier to a movable dwelling and that allows the foundation pier to be secured during transit of the movable dwelling without reducing ground clearance of the dwelling during transit.

2. Description of Related Art

Within the context of movable structures, foundation systems that can be relatively easily disassembled are generally preferred. Foundation systems that incorporate independently positionable piers are therefore especially appropriate for movable dwellings, such as mobile homes, commercial coaches and certain types of temporary or emergency offices.

The structural designs of movable dwellings are typically developed to enhance the facile transportability characteristics of the dwelling on roadways. This design consideration usually results in dwellings that have a larger length dimension than width dimension, in order to maximize floor space but be most suitable transporting the dwelling to a desired installation site, via a truck for example.

Most mobile dwellings are provided with a plurality of spatially positioned, elongated support girders or beams that extend parallel to the longer axis of the structure. The support beams often have an "I" cross sectional configuration. A plurality of spatially positioned floor joists, that may have either a "J" or "C" cross sectional configuration, are supported by the beams and extend across the width of the unit. Some movable dwellings may incorporate a perimeter chassis with a beam having a "C" configuration.

The incorporation of a plurality of piers placed under an intersecting pattern of support beams and floor joists is a therefore a common and preferable type of foundation system when installing the movable dwelling at an installation site. The piers transfer and support the weight of the dwelling from a beam to a ground surface. The piers are frequently positioned at key structural locations within the foundation system and beneath a beam, such as at an intersection of the beam and a joist. Foundation systems employing C-beams may have piers spatially positioned along the beam at predetermined intervals to support the unit. The placement pattern of the piers and the distances between piers may also be governed by such factors as the dimensions of the unit and applicable building codes at the installation site of the unit.

Foundation piers in the prior art often comprise a base plate for supporting the pier on the ground of the installation site and a pair of opposing supports affixed to the base. Adjustable extensions are included for adjusting the height of the pier. The piers may include suitable means affixed to the extensions for coupling the extensions to a beam of the unit. The coupling means often comprises a platform that has upwardly extending threaded shafts. A plate is held in a desired horizontal position by the threaded shafts using well known methods. The plate is adjusted upwardly until it abuts the beam. A pair of brackets, coupled to the shafts, are placed over the bottom portion of the desired beam and tightened onto the beam, to secure the pier to the beam.

Another prior art foundation pier is disclosed in U.S. Pat. No. 5,595,366, to Cusimano et al. The pier disclosed therein is directed to supporting a movable dwelling, such as a mobile home or commercial coach. The disclosed pier includes a base plate having a threaded shaft, with a plurality of webs spatially positioned about the shaft. A support member has a first end threadably coupled to the shaft for adjusting the height of the pier. Couple members are detachably coupled to a second end of the support member. The couple members attach the pier to a support beam of the movable dwelling, to prevent movement between the pier and the dwelling. A clamp member, affixed to the plurality of webs, couples to the support member for preventing movement of the support member relative to the shaft and the clamp member. Environmental forces applied to the support member are transmitted from the clamp member and distributed through the plurality of webs to prevent the pier from collapsing.

However, it is disadvantageous that the pier is not at least semi-permanently attached to the unit. Since prior art piers are not semi-permanently attached to the unit, they are installed once the unit is at the desired installation site, instead of prior to transporting the unit to the site. Often, the piers are improperly installed, potentially causing the pier to fail, and thus damaging either the unit, the pier, or both.

U.S. patent application Ser. No. 08/650,183, filed May 20, 1996 by the Applicant, now U.S. Pat. No. 5,711,504, and incorporated herein in its entirety by reference, discloses a pier that provides hingeable coupling means for coupling the pier to the foundation of a movable dwelling. The disclosed pier can be alternatively pivoted from a transportation position and into a load bearing position, or installation position, and back to the transportation position. A retaining member is provided for retaining the pier in the transportation position to prevent the pier from accidentally contacting a ground surface during transportation of the movable dwelling. In the transportation position, the pier is located below the lower edge of a beam and thus reduces the ground clearance during transit of the movable dwelling to the installation site.

Therefore, there still exists a need for a coupling system that semi-permanently attaches a foundation pier to a moveable dwelling, that easily and safely stows and secures the foundation pier during transit of the moveable dwelling and does not reduce the ground clearance of the movable dwelling during transit.

OBJECTS OF THE INVENTION

It is therefore an object of the present invention to provide an improved coupling system for attaching a foundation pier to a support beam of a movable dwelling;

It is another object of the present invention to provide a coupling system for semi-permanently affixing a foundation pier to a movable dwelling to a support beam of the dwelling prior to transporting the dwelling to an installation site;

It is a further object of the present invention to provide a system for coupling a foundation pier to a support beam of a movable dwelling so that the pier is secured to the support beam in a transportation position when transporting the dwelling, and is movable to an installation position for supporting a portion of the weight of the dwelling when the dwelling is at an installation site;

It is still another object of the present invention to provide a coupling system to couple a foundation pier to a support beam of a movable dwelling that does not substantially reduce ground clearance of the dwelling when the foundation pier is secured in a transportation position;

It is yet a further object of the present invention to provide a coupling system that couples a foundation pier to a support beam of a movable dwelling that may be installed in a foundation system that incorporates prior art foundation piers; and It is another object of the present invention to provide a coupling system that may be installed by hand.

SUMMARY OF THE INVENTION

These and other objects and advantages of the present invention are achieved by providing a system for coupling a foundation pier to a beam of a foundation system of a movable dwelling that allows the pier to be secured to the beam during transit of the dwelling without reducing the ground clearance thereof. The invented system semi-permanently attaches a foundation pier to a beam of a foundation system of the movable dwelling. The system provides means for alternating the foundation pier between a transportation position and an installation position.

The preferred embodiment of the present invention includes a coupling means for hingably attaching the pier to the beam and includes a retaining means for retaining the pier in the transportation position. Particularly, the coupling system of the preferred embodiment includes a detachably coupled foundation pier. The pier of the present invention includes an adjustable length body to facilitate the positioning of the pier between the beam that the pier is secured to and a ground surface at the installation site. The pier of the preferred embodiment is configured to withstand increased environmental forces, such as seismic and wind forces.

In the preferred embodiment of the present invention, the coupling means includes an installation base, an installation base bracket, an intermediate bracket, a pier capture pin, and locking means. When the pier is placed in the installation position, the beam rests upon a top plate of the pier. The weight of the beam supported by the pier is transferred through the adjustable length body and a ground plate of the pier to the ground surface. Thus, when the pier is in the installation position the pier supports a portion the weight of the dwelling, while still being attached to the coupling means of the invented system.

The locking means are used to secure the pier to the installation base when the pier is in the installation position. The locking means of the preferred embodiment includes a pier capture pin that extends through a set of aligned apertures formed through the installation base and the top plate for securely coupling the base to the top plate.

A length of the pier capture pin is rigidly affixed to an edge of the top plate of the pier.

An extended element of the pier capture pin is rotatably attached to the intermediate bracket. The intermediate bracket comprises an L shape, with the intermediate bracket having first and second flat sections. The first flat section of the intermediate bracket is rotatably linked at a first rotatable attachment point to the installation base bracket. The second flat section is rotatably coupled to the pier capture pin at a second rotatable attachment point. The first and second rotatable attachment points provided by the intermediate bracket, and within the coupling means allows the pier to be rotated about three different axes, for rotating the pier between the transportation and installation positions.

The first rotatable attachment point allows the intermediate bracket to rotate in a vertical plane and about an axis of a horizontal plane that is perpendicular to the length of the beam. Further, the rotation of the intermediate bracket allows the second flat section to rotate at least ninety degrees in the vertical plane. The movement of the second flat section of the intermediate bracket about the second rotatable attachment point enables rotation of the pier capture pin from a vertical axis perpendicular to the horizontal plane to an axis parallel to a horizontal plane and parallel to the length of the beam. The resultant range of motion provided by the coupling means allows the pier to be rotated about all three spatial dimensions while remaining attached to the coupling means and thus coupled to the beam.

The coupling means of the preferred embodiment of the present invention semi-permanently attaches the pier to the beam and provides a locking means to secure the position of the pier relative to the beam. The locking means preferably includes pin members for coupling the top plate of the pier to the installation base of the coupling means.

The transportation position retaining means are provided to retain the pier in a position relative to the beam that does not substantially reduce the ground clearance between the bottom of the beam and a ground surface, such as a roadway, while the dwelling is in transit. In the preferred embodiment, the retaining means includes a retaining plate that is detachably coupled to the beam at a predetermined length from the coupling means and lies in a horizontal plane. A vertical retaining post is affixed to the retaining plate. When the pier is in the transportation position, the ground plate of the pier is placed adjacent and approximately parallel to the retaining post. An aperture located on the ground plate is aligned with an aperture in the retaining post. A retaining pin member is disposed through the aligned apertures and secured to the post and ground plate, for coupling the plate to the post. In the preferred embodiment, the aperture in the retaining post is positioned so that the pier rests on the retaining plate, when the ground plate is secured to the retaining post and ground clearance is not reduced.

Prior to transporting the dwelling, a plurality of systems of the present invention may be secured to the dwelling by attaching a plurality of coupling means and retaining means to the support beams of the dwelling. The top plate of each pier is then secured to the coupling means as discussed above. The pier is then rotated to the transportation position and secured to the retaining means. The pier is thus securely retained to the retaining means in the transportation position and does not reduce the ground clearance of the dwelling while the dwelling is in transit.

Once the dwelling is at the installation site, each of the piers are rotated from the transportation position to the installation position for constructing a foundation system. At the installation site each pier is rotated from the transportation position to the installation position by means of a circuitous path. The pier is first rotated to an intermediate position by rotating the base of the pier away from the retaining means in a horizontal plane that is generally parallel to the length of the beam. The base is then rotated away from the beam until the pier forms an angle of approximately 90 degrees with the beam, wherein the pier is in the intermediate position. Once the pier is in the intermediate position, the pier is rotated about its axis by means of the first attachment point, to orient the pier for rotation to the installation position. The pier is then swung downwards about the second attachment point and into the installation position.

In the installation position the pier is located beneath the beam, with the top plate located beneath the beam and the ground plate placed on the ground surface. The locking means may then be installed to prevent the pier from inadvertently pivoting relative to the beam. The length of the body of each of the piers is then adjusted so that the pier exerts some force on the beam and ground surface for securing the pier therebetween. Thus, the pier aids with supporting the dwelling by transferring a portion of the weight load of the dwelling to the ground surface, while the pier's body is configured to withstand increased environmental forces. Additionally, the base of the pier can be secured to the ground surface, as disclosed in U.S. Pat. No. 5,595,366, to further enhance the pier's ability to withstand increased environmental forces, such as seismic and wind forces.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein.

Figure 1:
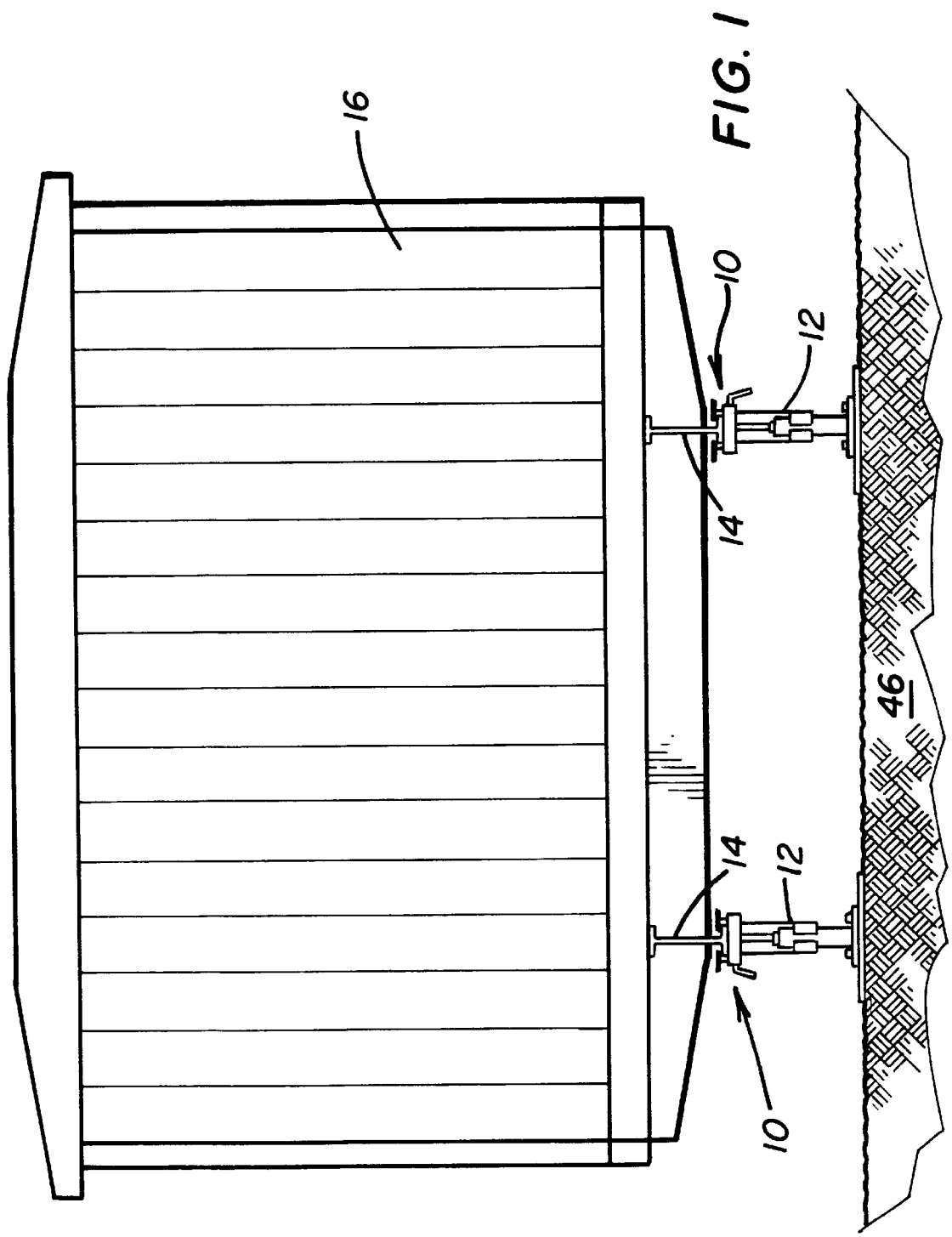
FIG. 1 is a front elevational view showing a movable dwelling supported by a plurality of foundation piers coupled to the dwelling by means of the coupling system of the preferred embodiment of the present invention.

Referring now to FIG. 1 of the drawings, there is shown generally at 10, a preferred embodiment of a coupling system constructed according to the principles of the present invention for coupling a foundation pier 12 to a support beam 14 of a movable dwelling, such as a commercial coach 16. The pier 12 as shown is in an installation position for supporting a portion of the weight of the dwelling 16. The invented system 10 is preferably configured to endure significant loads and stresses, including environmental forces such as seismic and wind forces, and comprises hardened steel alloys or other suitable materials known in the art.

Figure 2:
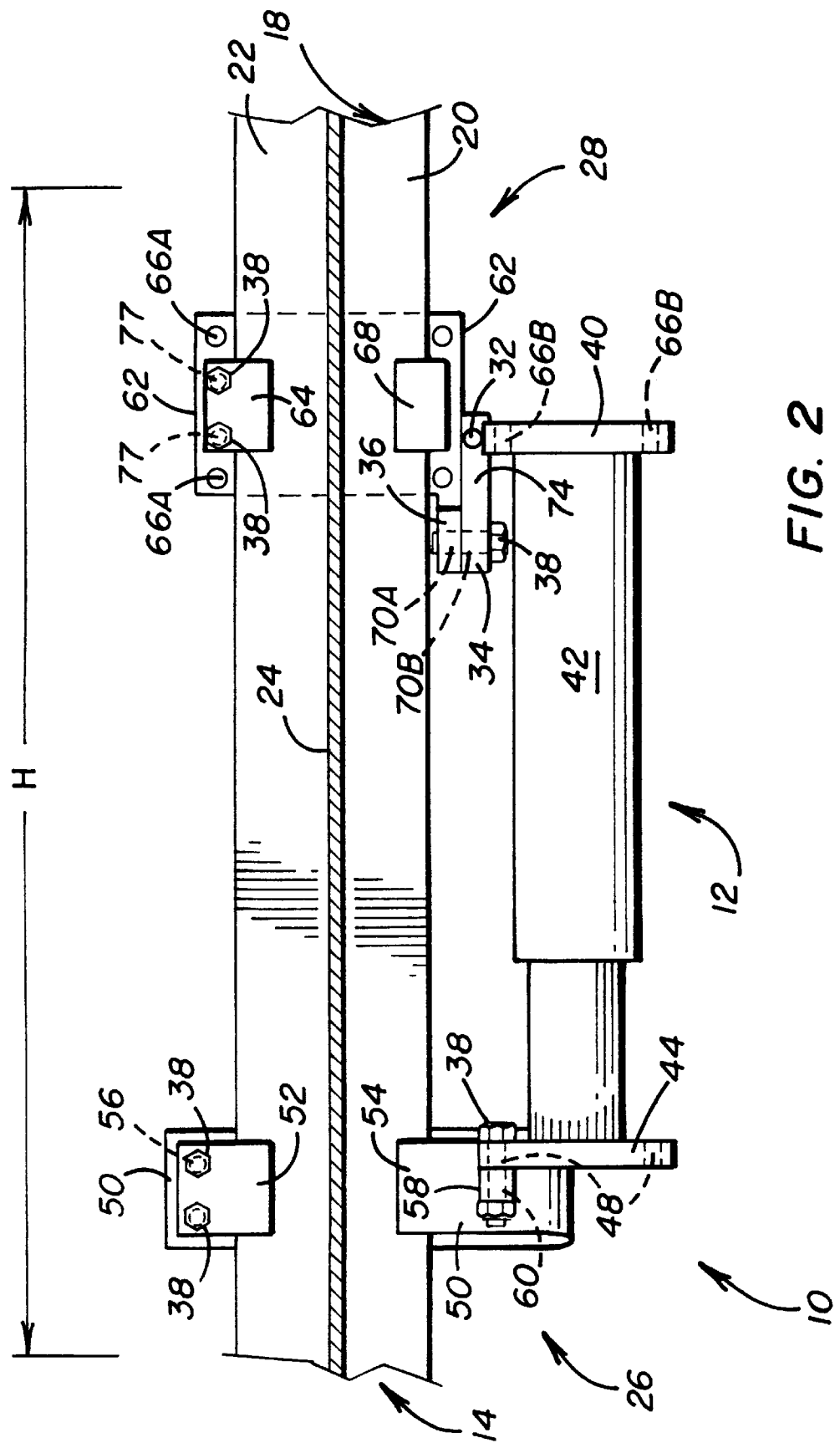
FIG. 2 is a top view showing the preferred embodiment retaining a pier in a transportation position on an I-beam shown partially in cross-section.

Referring now to the drawing Figures, and particularly to FIG. 2, the invented coupling system 10 is adapted to retain the pier 12 in a transportation position, wherein the pier 12 is retained in a horizontal plane H that extends generally parallel to the length of the beam 14. The beam 14 may comprise a well known "I" beam that comprises a lower flange 18 having a first side 20 and a second side 22, an upper flange (not shown) secured to the dwelling 16, and a vertical web 24 extending therebetween.

The invented system 10 includes the pier 12, retaining means shown generally at 26, and coupling means shown generally at 28, each of which is semi-permanently attached to the beam 14. The pier 12 is hingably attached to the coupling means 28 through a series of linkages including a pier capture pin 32, an intermediate bracket 34, an installation bracket 36, and securing means 38, for securing the intermediate bracket 34 to the installation bracket 36. The securing means 38 may comprise a nut-bolt combination for example.

In the preferred embodiment, the pier 12 comprises a top plate 40, an adjustable length body 42, and a ground plate 44. The length of the body 42 may be adjusted by known means, such as a threaded shaft, to change the distance between the top plate 40 and ground plate 44 to accommodate different distances between the beam 14 and a ground surface 46, when the dwelling 16 is located at an installation site and the pier 12 is in the installation position. The ground plate 44 may have at least one aperture 48 formed therethrough. The apertures 48 are provided for securing the ground plate 44 to the retaining means 26 and for securing the pier 12 to the ground 46. Additionally, the capture pin 32 is affixed, such as by welding, to an edge of the top plate 40 of the pier 12, thus permanently rotatably coupling the pier 12 to the intermediate bracket 34.

Referring still to FIG. 2 of the drawings, the pier's 12 ground plate 44 is secured to the retaining means 26, for temporarily retaining the pier 12 in the transportation position. The retaining means 26 includes a substantially J-shaped retaining plate 50 and a compression plate 52. The retaining plate 50 extends beneath the lower flange 18 and has a lip 54 configured to extend about and slip-fit one of the sides 20, 22 of the flange 18 for coupling the plate 50 thereto. A pair of apertures 56 are formed through the compression plate 52 and retaining plate 50 for receiving securing means 38, for securing the compression plate 52 to the retaining plate 50. The compression plate 52 is preferably configured to extend over a remaining one of the sides 20, 22 of the flange 18 opposite to the lip 54. The securing means 38, which may comprise nut-bolt combinations, are tightened against the two plates 50, 52 for securely coupling the retaining means 26 to the beam 14.

The retaining means 26 additionally includes an upwardly projecting retaining post 58 that is permanently affixed to the retaining plate 50 by known means, such as welding for example. Preferably, the retaining post 58 comprises a suitably dimensioned portion of hardened steel alloy that is capable of retaining the pier's 12 ground plate 44, while the dwelling 16 is in transit. When the pier 12 is placed in the transportation position, the aperture 48 formed through the ground plate 44 is aligned with an aperture 60 formed in the retaining post 58. A securing means 38 is then disposed through the aligned apertures 48, 60 and tightened against the plate 44 and the post 58, for securing the pier 12 to the retaining means 26, thereby securing the pier 12 in the transportation position. The length of the pier's body 42 can be adjusted so that its ground plate 44 exerts some slight force on the post 58 for securely retaining the pier 12 in the transportation position. Additionally, in the transportation position, the ground plate 44 rests upon the retaining plate 50 so that a portion of the weight of the pier 12 is supported by the retaining plate 50, for further increasing the stability of the pier 12 during transit.

Figure 3:
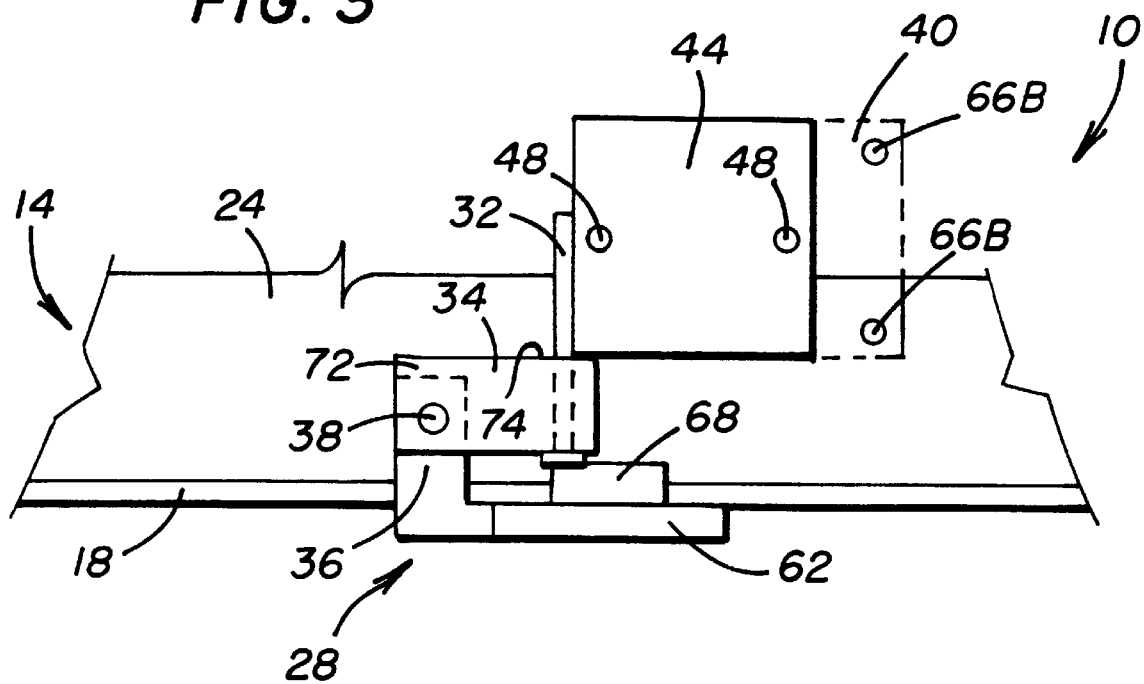
FIG. 3 is a side view of the invented system wherein the pier is rotated to an intermediate position.
Figure 4:
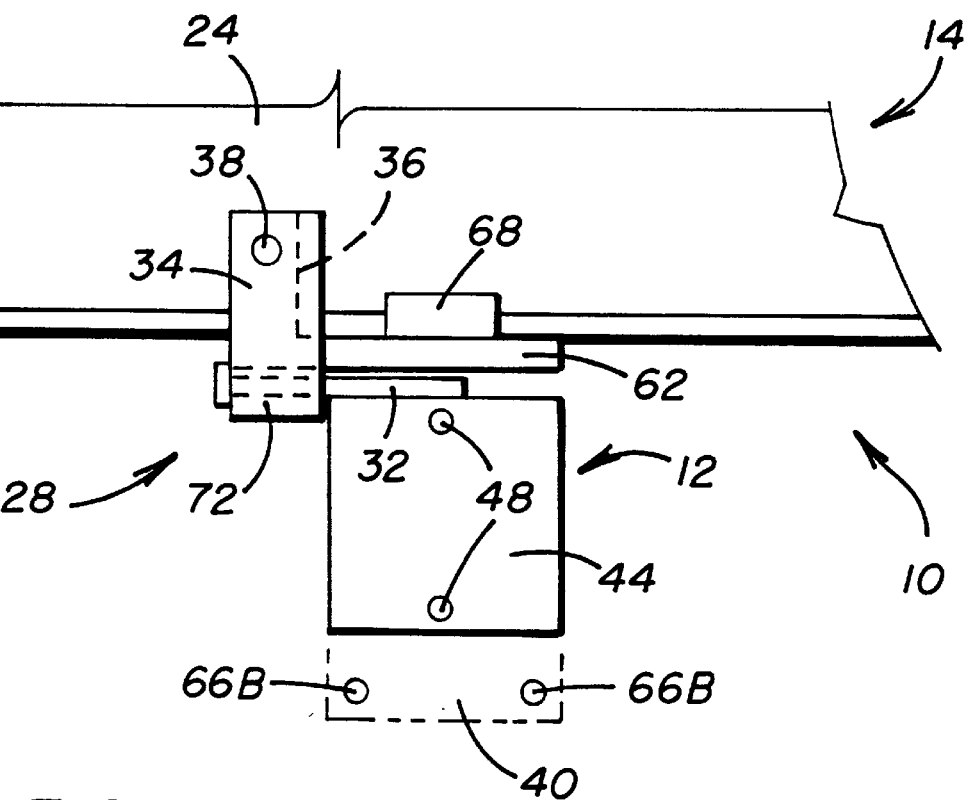
FIG. 4 is a side view of the preferred embodiment wherein the pier is in the intermediate position and is oriented for rotation of the pier to an installation position.
Figure 5:
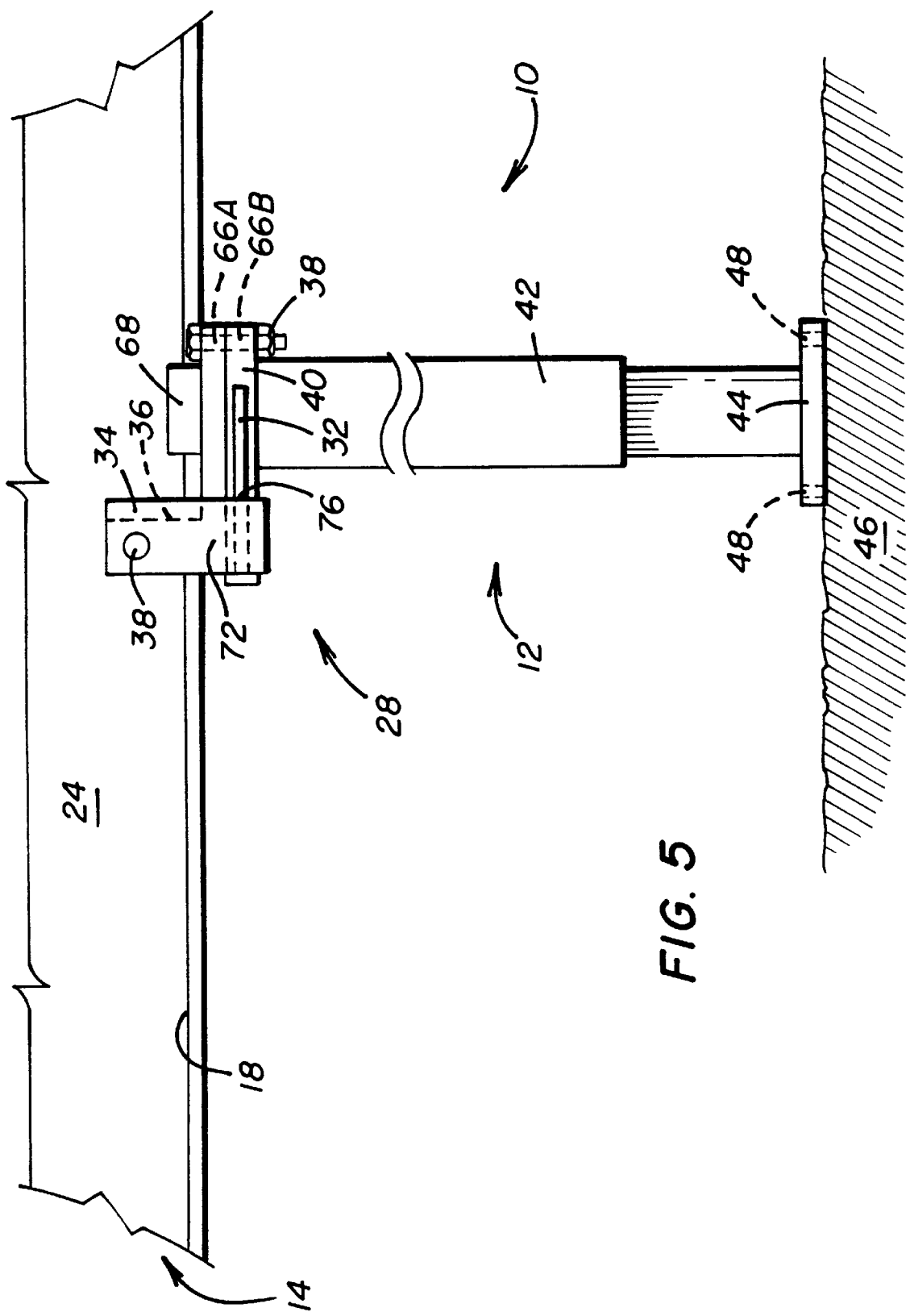
FIG. 5 is a side view of the preferred embodiment of the invented coupling system showing the pier in the installation position.

Referring still to FIGS. 2–5, the coupling system 10 of the present invention allows rotation of the pier 12 from the transportation position to the installation position, via an intermediate position (shown in FIG. 3 and FIG. 4). The coupling means 28 comprises an installation plate 62 that extends beneath the beam's lower flange 18 and a compression plate 64. In the preferred embodiment the installation plate 62 is dimensioned similarly to the top plate 40 of the pier 12 and includes a plurality of openings 66A formed therethrough, adjacent to each corner thereof. The openings 66A are positioned in the installation plate 62 to align with openings 66B in the top plate 40, when the pier 12 is in the installation position, for securing the pier 12 to the installation plate 62, and thus to the beam 14. The installation plate 62 further includes an inwardly projecting tab member 68 that slip-fits one of the sides 20, 22 of the flange 18 for coupling the plate 62 to the beam 14. The installation bracket 36 is formed integrally with the installation plate 62, proximal to the tab 68, and extends vertical to the horizontal plane H.

The intermediate bracket 34 is rotatably coupled to the installation bracket 36 using known means, such as the previously discussed securing means 38. For example, a hole 70A is formed through the installation bracket 36 and another hole 70B is formed through a vertical section 72 of the intermediate bracket 34. The holes 70A, 70B are then aligned and securing means 38 are disposed through the aligned holes 70A, 70B for rotatably coupling the two brackets 34, 36. Securing means 38 such as nut-bolt combinations as previously discussed are preferred, since the nut-bolt combinations can be tightened to securely coupled the two brackets 34, 36 together to further aid with retaining the pier 12 in the transportation position. The intermediate bracket 34 further includes a flat, horizontal section 74 having the pier capture pin 32 rotatably coupled therein. The capture pin 32 extends vertically to the horizontal section 74 and is retained in an opening 76 formed through the section 74, distal to interconnection between the intermediate bracket 34 and installation bracket 36.

Mating pairs of apertures 77 are formed through each of the compression plate 64 and installation plate 62 for receiving securing means 38, for securing the compression plate 64 to the installation plate 62. The apertures 77 are positioned in the installation plate 62 and compression plate 64, so that a portion of the compression plate 64 extends over one of the sides 20, 22 of the flange 18 opposite to the inwardly projecting tab 68. The securing means 38, which may comprise nut-bolt combinations, are tightened against the two plates 62, 64 for securely attaching the coupling means 28 to the beam 14.

The pier 12 is rotated from the transportation position to the installation position (shown in FIG. 1 and FIG. 5), by first rotating the pier 12 to an intermediate position (shown in FIG. 3 and FIG. 4), wherein the pier 12 is positioned generally perpendicularly to the beam 14. The pier 12 is rotated to the intermediate position by first detaching the pier's ground plate 44 from the retaining means 26. For instance, the nut-bolt combination 38 is removed from the aperture 48 and the length of the body 42 is reduced to release the ground plate 44 from the retaining post 58. The ground plate 44, and thus the pier 12, is rotated away from the retaining means 26 generally along the horizontal axis H, until the pier 12 forms an angle of approximately 90 degrees with the beam 14. The rotational coupling of the capture pin 32 with the intermediate bracket 34 facilitates the rotation of the pier 12 to the intermediate position. The pier 12 is then rotated generally about its axis and in a clockwise direction, for rotating the intermediate bracket 34 relative to the installation bracket 36, which causes the pier 12 to rotate downwardly, such that the pier 12 is positioned beneath the installation plate 62 of the coupling means 28 and thus the lower flange 18 of the beam 14. The pier 12 is now oriented for rotation to the installation position.

The pier 12 is then rotated to the installation position, wherein the pier's top plate 40 is located directly beneath the installation plate 62, and the plurality of openings 66A, 66B in the top plate 44 and installation plate 62 are substantially aligned. Securing means 38, such as the discussed nut-bolt combinations, are disposed through the aligned openings and tightened for attaching the top plate 44 to the installation plate 62, and thus securing the pier 12 to the beam 14. The pier 12 is thus securely coupled to the beam 14 when the pier 12 is in the installation position to aid with forming a foundation system. The ground plate 44 of the pier 12 can then be secured to the ground surface 46, as disclosed in the cited prior art, to enhance the pier's ability to withstand increased environmental forces, such as seismic and wind forces.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An Assembly for attaching to a support beam of a movable dwelling, the assembly comprising:

a foundation pier that includes a top plate, an adjustable length body, and a ground plate, the adjustable length body including means for retaining the pier at different predetermined lengths;

coupling means for semi-permanent attachment to a lower flange of the support beam for securing the pier to the beam, the coupling means including an intermediate bracket for pivotally coupling to the beam by a pier capture pin pivotably coupled to the intermediate bracket and affixed to the top plate of the pier, the intermediate bracket and capture pin coacting to enable the pier to be alternatively pivoted between a transportation position and an installation position when mounted to the support beam;

retaining means for detachably coupling to the lower flange of the support beam a selected distance from the coupling means, the retaining means including a retaining post and securing means for detachably securing the ground plate of the pier to the post for retaining the pier in the transportation position, the retaining means coacting with the coupling means to retain the pier in the transportation position, such that a lowest portion of the pier does not reside beneath the lower flange of the beam when the pier is retained in the transportation position, a retaining plate for detachably coupling to the lower flange of the support beam a selected distance from the coupling means, the retaining plate affixed to the retaining post for supporting the retaining post; and the securing means comprising, an aperture formed through the post and at least one aperture formed through the ground plate of the pier, the aperture positioned in the ground plate, such that when the pier is positioned in the transportation position, the aperture in the ground plate substantially aligns with the aperture through the post, and a securing assembly disposed through the aligned apertures and tightened against the ground plate and post for coupling the ground plate and post together and couple the pier to the retaining means, wherein the selected distance between the coupling means and the retaining means along the support beam is approximately equal to a length of the pier, and wherein the length of the body of the pier is adjusted so that the ground plate exerts some slight force on the post to aid with securely retaining the pier in the transportation position.

2. The coupling system of claim 1 wherein when the pier is in the transportation position, the ground plate rests slightly upon the retaining plate so that a portion of the weight of the pier is supported by the retaining means and a portion of the weight of the pier is supported by the coupling means for increasing the stability of the pier in the transportation position during transit of the dwelling to an installation site.

* * * * *